June 24, 1930.  C. C. EGBERT  1,767,918
IMPLEMENT FOR FILLING FARINACEOUS TUBULAR ROLLS WITH FOOD PRODUCTS
Filed Sept. 16, 1926

INVENTOR
Charles C. Egbert
BY
J. W. Ellis
ATTORNEY

Patented June 24, 1930

1,767,918

UNITED STATES PATENT OFFICE

CHARLES C. EGBERT, OF NIAGARA FALLS, NEW YORK

IMPLEMENT FOR FILLING FARINACEOUS TUBULAR ROLLS WITH FOOD PRODUCTS

Application filed September 16, 1926. Serial No. 135,784.

My invention relates in general to implements for handling food products such as strips or rolls of meat and in particular to a device for filling tubular rolls of farinaceous material, such as those shown and described in United States Patent No. 1,589,850, with sausages commonly known as "wieners" or "hot dogs."

The principal object of my invention has been to provide an implement whereby a hot sausage may be easily and quickly picked from the utensil in which it is cooked and drawn into a tubular roll.

Another object has been to provide such a device whereby the sausage may be drawn into the tubular roll without splitting or mutilating the roll.

Furthermore, it has been an object to provide an implement by which a hot sausage may be placed in a tubular roll without touching the sausage with the hands, thus accomplishing the operation in a thoroughly sanitary manner.

Moreover, my implement may be used to manipulate and turn the sausages in the pan or other utensil while they are being cooked.

Figure 1:
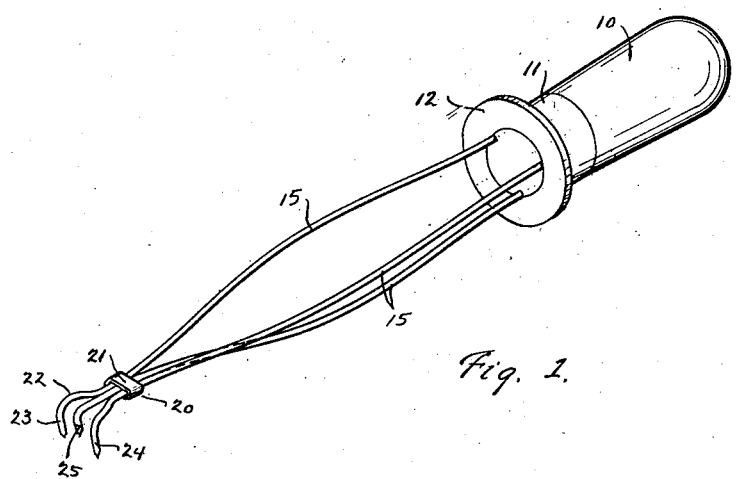
Figure 2:
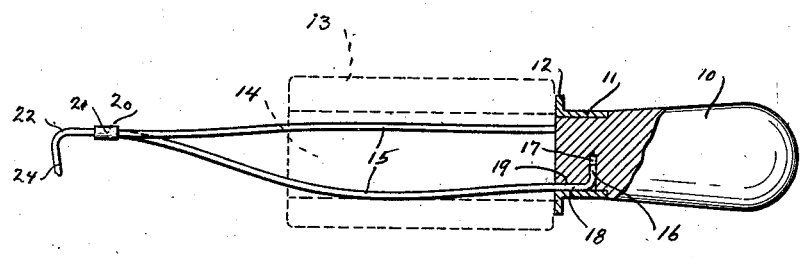
Figure 3:
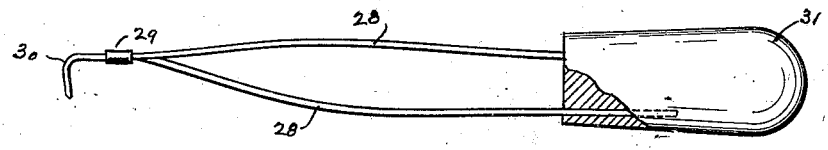

The above objects and advantages have been accomplished by the device shown in the accompanying drawings, of which;

Fig. 1 is a perspective view of my device.
Fig. 2 is a side, sectional view of the same.
Fig. 3 is a side elevation of a simplified form of structure, partly in section.

Referring to the form of invention shown in Figs. 1 and 2, the implement comprises a handle 10, preferably of wood. A ferrule 11 is secured to the handle and the ferrule has an outwardly extending annular flange 12 which acts as a stop for the tubular roll 13, which is shown in dotted lines in Fig. 2. The tubular roll is provided with the usual central hole 14 with which the holding portion of my implement is engageable, which portion comprises a plurality of holding wires 15. These holding wires are preferably three in number and the inner end of each in this form of invention is provided with a right angle bend 16, which is fitted into a radial hole 17 formed in the handle. The portion 18 of each wire immediately adjacent the end 16 is fitted into a slot 19 formed in the handle. By means of the slot 19 and the hole 17, each wire is securely attached to the handle, and the ferrule 11 holds the ends in engagement with the slots and holes. The holding wires 15 are flared outwardly somewhat from the point of attachment to the handle 10, so that when a roll 13 is placed over them, they will be forced toward each other and thereby resiliently hold the roll in place temporarily. The outer ends of the wires are brought to a common point 20 where they are fastened either by a rigid ferrule 21 or by being soldered, brazed, welded, or otherwise secured together so as to form one integral piece at this point. The outwardly extending ends 22 of the wires, as they leave the point 20 are flared outwardly and bent substantially at right angles so as to provide tines 23, 24, and 25. These tines form the tine or hook portion of my implement and are preferably sharpened at their lower ends and the outer tines 23 and 24 are longer than the central tine 25. With this arrangement, when the implement is being used, the outer tines will serve to center the sausage and to firmly hold it while the tines are being driven into it. The tine portion is smaller than the holding portion so that it may be readily slipped through the roll.

The simplified form of invention shown in Fig. 3 has a plurality of holding wires 28 which are brought together and suitably fastened at 29. The implement is formed at its forward end with a hooked portion 30, similar to that of the other form of the invention. A handle 31 is provided on this implement, and the holding wires 28 are driven into the handle and are preferably held therein by means of friction. The ends of the wires may be serrated, if desired, before being driven into the handle.

It will be clear from the foregoing that by means of my implement, a sausage can be manipulated in the cooking utensil while the implement is grasped in one hand of the operator. When the device is to be used to fill a tubular roll, such a roll is placed upon the device as shown by the dotted lines in Fig. 2 by passing the wires 15 through the hole of the roll and pushing the implement through the roll until the hilt formed by the annular flange 12 carried by the handle engages the forward end of the roll. It is obvious that since the holding wires 15 are slightly bent outwardly so that a circle described about them is somewhat larger than the size of the hole in the tubular roll, these holding wires will be forced toward each other as the roll is placed over them, thus producing a resiliency in the wires which serves to hold the roll securely in temporary engagement with the implement.

With a tubular roll secured to the implement, the tine portion of the implement is placed in the utensil containing the cooked sausages and the tines 23, 24 and 25 are brought into registering position with the end of a sausage. As hereinbefore pointed out, due to the fact that the outer tines 23 and 24 are longer than the central tine 25, these outer tines will serve to center the sausage and hold it while the central tine 25, as well as the outer tines, are driven into the sausage. After the sausage has been hooked by the implement, it is obvious that it may be dipped in mustard or other condiment, if desired, before being drawn into the roll. Such an operation can be accomplished without having to touch the sausage with the hand. Furthermore, the one hand of the operator is free to open and close the condiment container. If desired, the interior of the roll may be coated with condiment before it is placed upon the implement, the holding wires having such small bearing contact with the roll that very little of the condiment will be removed before the sausage is drawn into the roll. When it is desired to place the sausage within the roll, the roll is grasped by the hand of the operator, and the implement drawn out of it which serves to draw the sausage into the hole of the tubular roll. When the forward end of the sausage appears at the far end of the roll, the tines may be unhooked therefrom, thus leaving the sausage within the roll.

Because of the nature of my implement, each tubular roll may be placed within a paper sack to prevent soiling or contamination when handling, either in the act of placing the roll upon the implement or while eating it. When so protected it is obvious that my implement may be forced through the bottom of the bag by puncturing it, and the sausage pulled into the roll in a manner identical with that just above described. If desired, the paper bag may remain on the roll as it is eaten, the bag of course being stripped from the roll during the process of consumption. Both the roll and the hands of the person eating it will, therefore, remain unsoiled.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. An implement for placing food products within a tubular farinaceous roll, comprising a handle, a plurality of interspaced, resilient holding wires carried by the handle and having outwardly bulging portions, and each of the wires being formed at its outer end with a rigid, interspaced hook, the hook of the middle wire being shorter than the hooks of the outside wires.

2. An implement for placing food products within a tubular farinaceous roll, comprising a handle, a right-angled hook portion for engaging the food, and a holding portion between the handle and the hook portion, the holding portion comprising a plurality of interspaced, resilient, holding wires carried by the handle and having outwardly bulging portions, the size of the hook portion being less than the size of the holding portion.

3. An implement for placing food products within a tubular farinaceous roll, comprising a handle, a right-angled hook portion for engaging the food, a holding portion between the handle and the hook portion, the holding portion comprising a plurality of interspaced, resilient, holding wires carried by the handle and having outwardly bulging portions, the size of the hook portion being less than the size of the holding portion, and means for permanently binding the wires together near their outer ends.

4. An implement for placing food products within a tubular farinaceous roll, comprising a handle, a right-angled hook portion for engaging the food, and a holding portion between the handle and the hook portion, the holding portion comprising a plurality of interspaced, resilient, holding wires having outwardly bulging portions for springing engagement with a farinaceous roll carried by the implement, each of the wires having its inner end bent at right angles and secured against axial movement in the handle, the size of the hook portion being less than the size of the holding portion.

5. An implement for placing food products within a tubular farinaceous roll, comprising a handle, a right-angled hook portion for engaging the food, and a holding portion between the handle and the hook portion, the holding portion comprising a plurality of interspaced, resilient, holding wires having outwardly bulging portions for springing engagement with a farinaceous roll carried by the implement, each of the wires having its inner end bent at right angles and secured against axial movement in the handle, and a ferrule carried by the handle and provided with an outwardly extending stop flange.

In testimony whereof, I have hereunto signed my name.

CHARLES C. EGBERT.